United States Patent
Oh

(10) Patent No.: US 11,904,842 B2
(45) Date of Patent: *Feb. 20, 2024

(54) METHOD FOR CONTROLLING DRIVING FORCE OF VEHICLE

(71) Applicants: Hyundai Motor Company, Seoul (KR); Kia Corporation, Seoul (KR)

(72) Inventor: Ji Won Oh, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,363

(22) Filed: Oct. 6, 2022

(65) Prior Publication Data
US 2023/0137834 A1 May 4, 2023

(30) Foreign Application Priority Data
Nov. 4, 2021 (KR) .......................... 10-2021-0150200

(51) Int. Cl.
*B60W 30/045* (2012.01)

(52) U.S. Cl.
CPC ....... *B60W 30/045* (2013.01); *B60W 2520/04* (2013.01); *B60W 2520/18* (2013.01); *B60W 2520/406* (2013.01); *B60W 2530/10* (2013.01); *B60W 2552/15* (2020.02); *B60W 2552/40* (2020.02); *B60W 2720/406* (2013.01); *F02D 2200/50* (2013.01); *F02D 2200/602* (2013.01); *F02D 2200/702* (2013.01)

(58) Field of Classification Search
CPC .............. B60L 12/20; B60L 2240/423; B60L 2240/463; B60W 10/06; B60W 10/08
See application file for complete search history.

(56) References Cited

U.S. PATENT DOCUMENTS

| 11,505,073 B1 * | 11/2022 | Oh .................... B60W 10/08 |
| 2023/0134424 A1 * | 5/2023 | Oh ..................... B60W 30/045 701/69 |

* cited by examiner

*Primary Examiner* — John Kwon
(74) *Attorney, Agent, or Firm* — MORGAN, LEWIS & BOCKIUS LLP

(57) ABSTRACT

A method for controlling driving force of a vehicle in which driving force of the vehicle is controlled by pre-reflecting vertical load information of tires in real time during turning of the vehicle, to solve repeated occurrence of wheel slip and wheel slip control performance degradation due to roll motion, includes determining, by a controller, a basic torque command in real time based on vehicle driving information obtained while driving of the vehicle, obtaining information related to left wheel and right wheel vertical loads in real time based on information collected by the vehicle, determining a torque upper limit from the real-time vertical load information, determining a final torque command limited so as not to exceed the determined torque upper limit from the real-time determined basic torque command, and controlling operation of a driving device in accordance with the determined final torque command.

20 Claims, 4 Drawing Sheets

METHOD FOR CONTROLLING DRIVING FORCE OF VEHICLE

CROSS-REFERENCE TO RELATED APPLICATION

The present application claims priority to Korean Patent Application No. 10-2021-0150200 filed on Nov. 4, 2021, the entire contents of which is incorporated herein for all purposes by this reference.

BACKGROUND OF THE PRESENT DISCLOSURE

Field of the Present Disclosure

The present disclosure relates to a method for controlling driving force of a vehicle. More particularly, it relates to a method in which driving force of a vehicle is controlled by pre-reflecting vertical load information of tires in real time during turning of the vehicle, to solve repeated occurrence of wheel slip and wheel slip control performance degradation due to roll motion.

Description of Related art

Recently, even though various electronic control devices are being introduced into vehicles, behavior of the vehicles is finally limited due to frictional force on roads. This is because behavior of a vehicle is obtained through frictional force between tires and a road. Therefore, how to effectively use frictional force is an important factor determining behavior of the vehicle.

To effectively use frictional force, it is important that driving force of vehicle wheels not exceed frictional force which a road may provide. Here, the frictional force provided by the road is influenced by a combination of characteristics of the road, slip amounts of tires in the longitudinal and lateral directions, vertical loads of the tires, etc., and thereamong, a factor most directly determining frictional force on the road may be the vertical loads of the tires.

In general, as measures using frictional force to limit slip of tires, electronic control devices, such as an anti-lock braking system (ABS) and a traction control system (TCS), are used. However, control methods using the ABS and the TCS cannot effectively exhibit slip control performance due to problems, such as control cycle delay or wheel speed signal processing for preventing erroneous operation.

According to recent trends in wheel slip control strategies of motor-driven vehicles, various methods using the torque and speed of a motor based on rapid behavior characteristics of the motor rather than an actual vehicle speed (a speed based on a vehicle body) and an actual wheel speed are being suggested.

These strategies do not require the absolute speed or reference speed of vehicles, and may thus be effective in an e-four wheel drive (e-4WD) system. However, when control in which roll motion in a vehicle changs in real time and vertical load information of tires changs thereby are pre-reflected is not performed, a situation in which driving force reduction control is necessary may be repeatedly generated due to a limit in feedback control.

For example, when front wheel driving force of a vehicle is generated during turning of the vehicle, roll motion is generated, and lateral load transfer is generated. That is, the roll motion is generated depending on a difference in compression or extension degrees in a left wheel suspension device and a right wheel suspension device due to the turning behavior of the vehicle, and simultaneously, lateral load transfer is generated in the vehicle.

Accordingly, slip of one of tires of the left wheel and the right wheel of the vehicle occurs, and in the instant case, when the TCS is operated to reduce front wheel driving force, the slip and the roll motion are reduced, and thus the vertical load of the tire of the inner wheel may be secured again. However, when front wheel driving force is increased again, the roll motion and lateral load transfer are generated again and thus slip of one of tires of the left and right wheels may occur again.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method in which driving force of a vehicle is controlled by pre-reflecting vertical load information of tires in real time during turning of the vehicle, to solve repeated occurrence of wheel slip and wheel slip control performance degradation due to roll motion.

The present disclosure is not limited to the above-described objects, and it is to be understood that other objects which are not described herein will be apparent to those skilled in the art from the following description.

Various aspects of the present disclosure are directed to providing a method for controlling driving force of a vehicle, the method including determining, by a controller, a basic torque command in real time based on vehicle driving information obtained while driving of the vehicle, obtaining, by the controller, information related to left wheel and right wheel vertical loads in real time based on information collected by the vehicle, determining, by the controller, a torque upper limit from the real-time vertical load information, determining, by the controller, a final torque command limited so as not to exceed the determined torque upper limit from the real-time determined basic torque command, and controlling, by the controller, operation of a driving device configured to drive the vehicle in accordance with the determined final torque command.

Other aspects and exemplary embodiments of the present disclosure are discussed infra.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
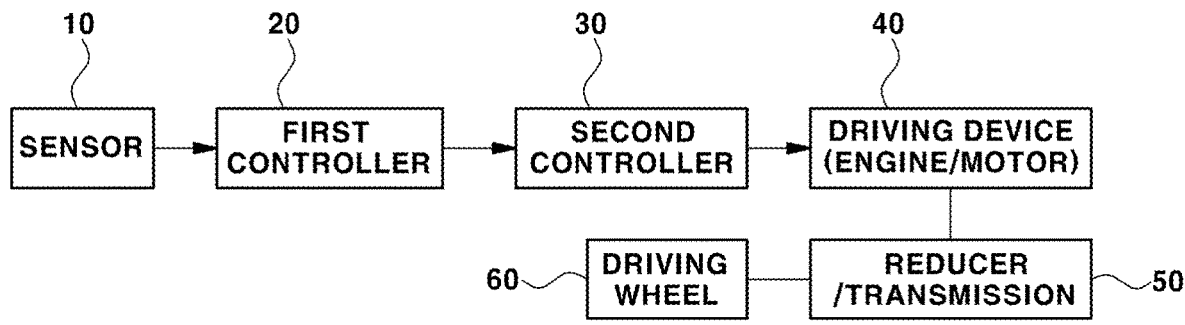
FIG. 1 is a block diagram illustrating elements of a system for controlling driving force of a vehicle according to an exemplary embodiment of the present disclosure.

It may be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions in embodiments of the present disclosure set forth in the description which follows will be exemplarily given to describe the embodiments of the present disclosure, and the embodiments of the present disclosure may be implemented in various forms. Furthermore, the present disclosure may not be interpreted as being limited to the embodiments set forth herein, and it will be understood that the present disclosure covers modifications, equivalents or alternatives which come within the scope and technical range of the present disclosure.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the present disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

As used herein, the same reference numerals or symbols in different drawings indicate the same elements. The terminology used herein is for describing various exemplary embodiments only and is not intended to be limiting. As used herein, singular forms may be intended to include plural forms as well, unless the context clearly indicates otherwise. The terms "includes," "including," "including," and "having" are inclusive and therefore specify the presence of stated features, integers, steps, operations, elements, components, and/or combinations thereof, but do not preclude the presence or addition of one or more other features, integers, steps, operations, elements, components, and/or combinations thereof.

Various embodiments of the present disclosure relates to a method for controlling driving force of a vehicle, and more particularly, to a method in which driving force of a vehicle is controlled by pre-reflecting vertical load information of tires in real time during turning of the vehicle, to solve repeated occurrence of wheel slip and wheel slip control performance degradation due to roll motion.

The conventional method for controlling wheel slip is a feedback control method in which driving force is corrected after wheel slip has already occurred. However, in an exemplary embodiment of the present disclosure, the magnitude of driving force is adjusted using vertical load information of tires of the vehicle before occurrence of wheel slip or using roll motion information of the vehicle or vertical load information of tires of the vehicle before occurrence of wheel slip, to correspond to change in the vertical loads of the tires in real time before occurrence of the wheel slip.

In an exemplary embodiment of the present disclosure, the roll motion may exclude roll motion due to the lateral tilt of a road. That is, in the following description, the roll motion may be suspension roll motion caused by a difference in compression or extension degrees in a left wheel suspension device and a right wheel suspension device, and a roll angle may be a suspension roll angle caused by the difference in compression or extension degrees in the left wheel suspension device and the right wheel suspension device.

For example, a state in which the suspension roll motion occurs may be a state in which there is a difference of strokes between the left wheel suspension device and the right wheel suspension device, and thus, the left wheel suspension device is more rebounded (i.e., extended) than the right wheel suspension device, the right wheel suspension device is more bumped (i.e., compressed) than the left wheel suspension device, the right wheel suspension device is more rebounded (i.e., extended) than the left wheel suspension device, or the left wheel suspension device is more bumped (i.e., compressed) than the right wheel suspension device.

One of factors most directly determining a limit in grip force between a road and a tire is the vertical load of the tire. As the vertical load of the tire increases, available grip force increases and thus wheel slip scarcely occurs, and as the vertical load of the tire decreases, available grip force also decreases and thus wheel slip easily occurs.

There are a lot of causes of changes in tire vertical loads, and it is difficult to control driving force of a vehicle in consideration of disturbance in the vehicle in addition to these causes. Therefore, at least the change in at the tire vertical load generated by roll motion other than the change in the tire vertical load generated by the disturbance deserves consideration in the control of driving force of the vehicle.

When the vehicle is turning, a roll moment occurs due to a difference between the center of gravity of the vehicle and the roll center, and the roll motion of the vehicle is excited. Therefore, a roll angle is generated by the dynamic characteristics of the vehicle and the suspension devices. In general, a vehicle body is tilted due to generation of a roll angle in a direction opposite to the turning direction of the vehicle due to sprung inertia of the vehicle, and in the instant case, roll motion occurs and thus the suspension devices of the vehicle are compressed and extended.

Here, the displacements of springs or dampers of the suspension devices occur, and thus influence the vertical loads of the corresponding tires. That is, lateral load transfer in the direction opposite to the turning direction of the vehicle occurs, and thus, an inner wheel vertical load is decreased and an outer wheel vertical load is increased during turning of the vehicle.

Such changed vertical loads of the tires change the limit in grip force in connection with occurrence of the roll motion. Therefore, in the case in which a limit in driving force is set in consideration of that, a torque reduction measure may be taken in advance before occurrence of wheel slip. Furthermore, considering that the maximum lateral grip force of a tire is inversely proportional to the longitudinal slip amount of the tire, lateral stability may be secured through a wheel slip prevention effect. Furthermore, a change of a roll angle due to start and end of TCS control may be suppressed through the wheel slip prevention effect, and thus, a roll damping effect may be acquired.

In the following description, an inner wheel of a vehicle may be defined as one of a left wheel and a right wheel of the vehicle, an outer wheel of the vehicle may be defined as the other of the left wheel and the right wheel of the vehicle, and in the instant case, the term "outer" may be defined as one of the left and right sides of the vehicle which has a greater vertical load (normal force) or an increasing vertical load, and the term "inner" may be defined as one of the left and right sides of the vehicle has less vertical load or a decreasing vertical load in consideration of lateral load transfer in the vertical, regardless of the turning direction of the vehicle.

Hereinafter, embodiments of the present disclosure will be described in detail with reference to the accompanying drawings.

Figure 2:
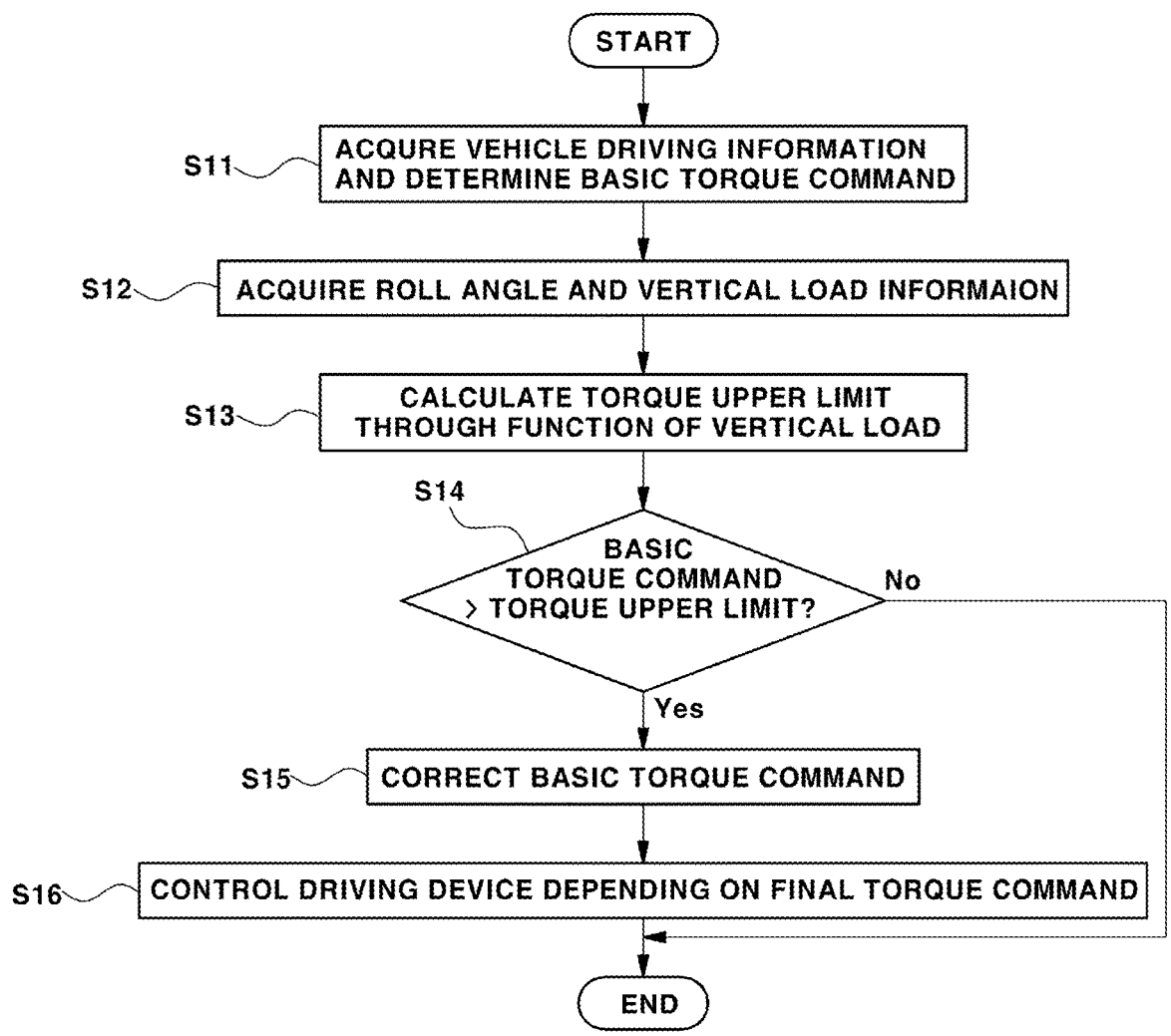
FIG. 2 is a flowchart illustrating a process of controlling driving force of the vehicle according to an exemplary embodiment of the present disclosure.

FIG. 1 is a block diagram illustrating elements of a system for controlling driving force of a vehicle according to an exemplary embodiment of the present disclosure, i.e., illustrating elements configured to control driving force of the vehicle, and FIG. 2 is a flowchart illustrating a process of controlling driving force of the vehicle according to an exemplary embodiment of the present disclosure.

In an exemplary embodiment of the present disclosure, driving force is force generated by a driving device 40 configured to drive the vehicle, and may be the sum of forces applied between tires of driving wheels 60 and a road. That is, driving force may include force generated in the driving wheels 60 by the driving device 40, and such force generated in the driving wheels 60 is caused by torque applied to the driving wheels 60 by the driving device 40 (for example, a motor) configured to drive the vehicle.

For example, when the driving device 40 of the vehicle is a motor, torque applied to the driving wheels 60 is driving torque output from the motor while driving of the motor or regenerative braking torque produced by the motor during regenerative braking. Here, the driving force conceptually includes not only driving force caused by torque output from the motor while driving of the motor but also regenerative braking force generated during regenerative braking through the motor.

Furthermore, the driving force may be controlled by controlling the torque of the driving device 40. Here, the torque is torque applied to the driving wheels 60, and conceptually includes both driving torque by the motor and regenerative braking torque by the motor. Furthermore, in the following description, "torque" and "torque command" may be substituted with "driving force" and "driving force command".

A system for controlling driving force of the vehicle includes a first controller 20 configured to determine a basic torque command from vehicle driving information, a second controller 30 configured to control operation of the driving device 40 in accordance with a final torque command received from the first controller 10, and the driving device 40 used as a driving source to drive the vehicle and configured so that operation of the driving device 40 (generation of torque by the driving device 40) is controlled by the second controller 30.

The first controller 20 determines the basic torque command from the vehicle driving information in real time, and outputs the final torque command, obtained by correcting the basic torque command, to the second controller 30. Accordingly, the second controller 30 controls operation of the driving device 40 in accordance with the final torque command output from the first controller 20. Torque and rotation force output from the driving device 40 are transmitted to the driving wheels 60 via a reducer or a transmission 50.

The basic torque command is determined and generated based on real-time vehicle driving information obtained by driving information detectors while driving of the vehicle, the driving information detectors may include sensors 10, and the vehicle driving information may be information which is detected by the sensors 10 and is input to the first controller 20 through a vehicle network. A method for determining the final torque command by correcting the basic torque command will be described later.

The sensors 10 configured to the vehicle driving information may include an accelerator position sensor (APS) configured to detect an accelerator pedal input value by a driver, a brake pedal position sensor (BPS) configured to detect a brake pedal input value by the driver, a sensor configured to detect the speed of a driving system, and a sensor configured to detect a vehicle speed.

The speed of the driving system may be the rotation speed of the driving device 40 or the rotation speed of the driving wheels 60 (i.e., wheel speed). Here, the driving device 40 may be an engine or a motor, and the rotation speed of the driving device 40 may be the rotation speed of the engine (engine speed) or the rotation speed of the motor (motor speed). Here, the sensor configured to detect the speed of the driving system may be a sensor configured to detect the engine speed or the motor speed, and the sensor configured to detect the motor speed may be a resolver configured to detect the position of a rotor of the motor. Otherwise, the sensor configured to detect the speed of the driving system may be a wheel speed sensor configured to detect the rotation speed of the driving wheel 60 (i.e., the wheel speed).

Furthermore, the sensor configured to detect the vehicle speed may also be the wheel speed sensor. A method for obtaining vehicle speed information from a signal from the wheel speed sensor has been known to those skilled in the art and a detailed description thereof will thus be omitted.

As the vehicle driving information detected by these sensors 10 to determine and generate the basic torque command, the accelerator pedal input value by the driver (i.e., the APS value), the brake pedal input value by the driver (i.e., the BPS value), the speed (i.e., the rotation speed) of the driving device 40, and the vehicle speed may be selectively used. Among the vehicle driving information, the accelerator pedal input value and the brake pedal input value may be referred to as driver input information, and the speed of the driving device 40 and the vehicle speed detected by the corresponding sensors 10 may be vehicle state information.

Otherwise, the vehicle driving information may be information autonomously determined by the first controller 20, or information (for example, demanded driving force information) input to the first controller 20 from other controllers (for example, an ADAS controller) in the vehicle through the vehicle network. The first controller 20 may be an upper-level control unit configured to generate the basic torque command based on the vehicle operation information, for example, a vehicle control unit (VCU) or a hybrid control unit (HCU), in a general vehicle.

Furthermore, in various exemplary embodiments of the present disclosure, the sensors 10 may further include a sensor configured to detect a steering angle due to operation of a steering wheel by the driver, or sensors of suspension devices configured to obtain suspension roll angle information which is roll motion information of the vehicle.

Here, the sensor configured to detect the steering angle, which is one of steering input values by the driver, may be a general steering angle sensor. Furthermore, the sensors of the suspension devices configured to obtain the suspension roll angle information may include the position sensor of a left wheel suspension device and the position sensor of a right wheel suspension device. A known method may be used in a process of obtaining the suspension roll angle information from the information detected by the sensors of the suspension devices. For example, the suspension roll angle information of the vehicle may be determined in real time by comparing the positions of the left wheel and the right wheel with each other based on signals from the position sensors.

Furthermore, a suspension roll angle may be obtained by a predetermined estimation process based on information collected by the vehicle through the above-described sensors 10, and a method for estimating the suspension roll angle has been known to those skill in the art and a detailed description thereof will thus be omitted.

The second controller 30 receives the final torque command output from the first controller 20 and controls operation of the driving device 40 in accordance with the received final torque command, and when the driving device 40 is a motor, the second control unit 20 may be a motor control unit (MCU) configured to drive the motor and to control operation of the motor through an inverter in accordance with the torque command.

In an exemplary embodiment of the present disclosure, the first controller 20 controls the magnitude of driving force during turning of the vehicle, and utilizes vertical load information of tires or utilizes the vertical load information of the tires and roll motion information (the suspension roll angle) of the vehicle to control driving force. Here, the vertical load of the tire (hereinafter, abbreviated to a "vertical load") and the suspension roll angle (hereinafter, abbreviated to a "roll angle") which is the roll motion information may be determined using a transfer function, and an example of determination of the vertical load and the roll angle using the transfer function will be described below.

Figure 3:
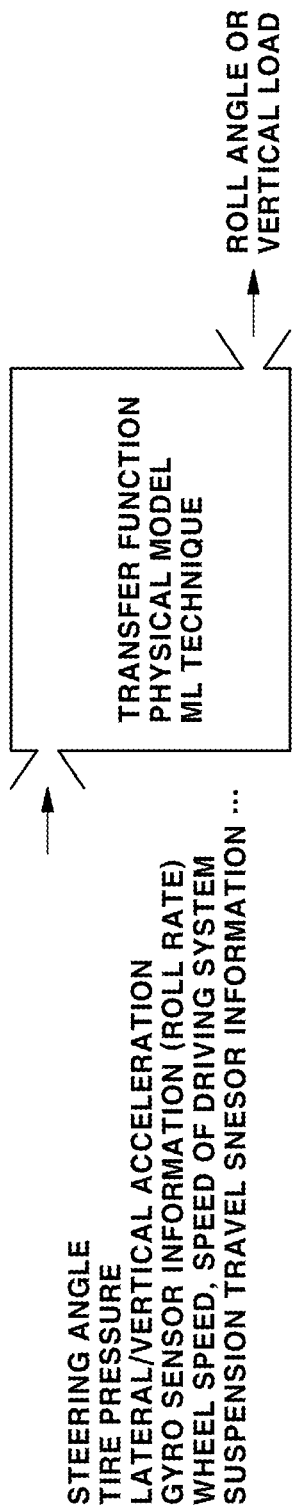
FIG. 3 is a view exemplarily illustrating determination of a vertical load and a roll angle using a transfer function.

FIG. 3 is a view exemplarily illustrating determination of a vertical load and a roll angle using a transfer function which utilizes information collected by the vehicle as input. In various exemplary embodiments of the present disclosure, the transfer function set in the first controller 20 may take the following format.

First, a transfer function which outputs roll angle information using steering angle and vehicle speed information as an input, or a transfer function which outputs vertical load information using roll angle information as an input may be used.

Otherwise, a transfer function which outputs vertical load information using steering angle and vehicle speed information detected by the sensors 10 as an input, or a transfer function which outputs vertical load information using tire pressure information detected by tire pressure sensors as an input may be used.

Otherwise, a transfer function which outputs roll angle or vertical load information using information detected by a lateral acceleration sensor or a vertical acceleration sensor provided in the vehicle as an input may be used. Otherwise, a transfer function which outputs roll angle or vertical load information using roll angle change rate information (a roll rate) obtained by a gyro sensor (a roll rate sensor) as an input may be used.

Otherwise, a transfer function which outputs roll angle or vertical load information using information detected by wheel speed sensors or other speed sensors of the driving system as an input may be used. Here, the speed of the driving speed may be the speed of the driving device 40 (engine speed or motor speed) or the speed of a driveshaft.

Otherwise, a transfer function which outputs roll angle or vertical load information using information detected by suspension travel sensors as an input may be used. Otherwise, a transfer function which outputs roll angle or vertical load information using two or more of the above-described input information as an input may be used.

Here, the transfer function may be set to determine the roll angle or the vertical load using data-driven optimization or numerical solution. Otherwise, the transfer function may be constructed based on a physical model, or a learning technique may be used to construct the transfer function. Otherwise, in addition to the transfer function, an algorithm having the above-described input and output may be constructed using various machine learning (ML) techniques.

FIG. 2 is a flowchart illustrating a process of controlling driving force of the vehicle according to various exemplary embodiments of the present disclosure, and the first controller 20 obtains vehicle driving information in real time, and determines a basic torque command based on the obtained vehicle driving information, as described above (Operation S11).

Thereafter, when there is a steering input by a driver, a steering angle, i.e., a steering input value, is detected by the corresponding sensor 10, and thereafter, the process of controlling driving force of the vehicle during turning of the vehicle according to an exemplary embodiment of the present disclosure is executed. To control driving force of the vehicle during turning of the vehicle, the first controller 20 obtains roll motion information (a roll angle) and vertical load information in real time, as described above (Operation S12).

After the first controller 20 has obtained the roll motion information and the vertical load information, the first controller 20 determines a torque upper limit in real time (Operation S13), and determines whether or not the basic torque command determined in real time based on the vertical driving information while driving of the vehicle exceeds the determined torque upper limit (Operation S14). Here, the torque upper limit may be determined by a designated equation from the real-time vertical load information, or may be determined through a designated equation from the real-time vertical load information and roll motion information (i.e., the roll angle), as will be described later.

Thereafter, the first controller 20 corrects the basic torque command only in a condition in which the basic torque command exceeds the torque upper limit (Operation S15), and executes driving force correction control in which operation of the driving device 40 is controlled using the corrected torque command (a torque command after correction) as the final torque command (a driving force command) (Operation S16). When the basic torque command does not exceed the torque upper limit, the first controller 20 controls the driving device 40 using the basic torque command as the final torque command.

In various exemplary embodiments of the present disclosure, the first controller 20 may determine the torque upper limit through a function of a vertical load. For example, the first controller 20 may determine the torque upper limit in proportion to the vertical load. Furthermore, the first controller 20 controls driving force of the driving device 40 by limiting the final torque command so as not to exceed the determined torque upper limit.

Figure 4:
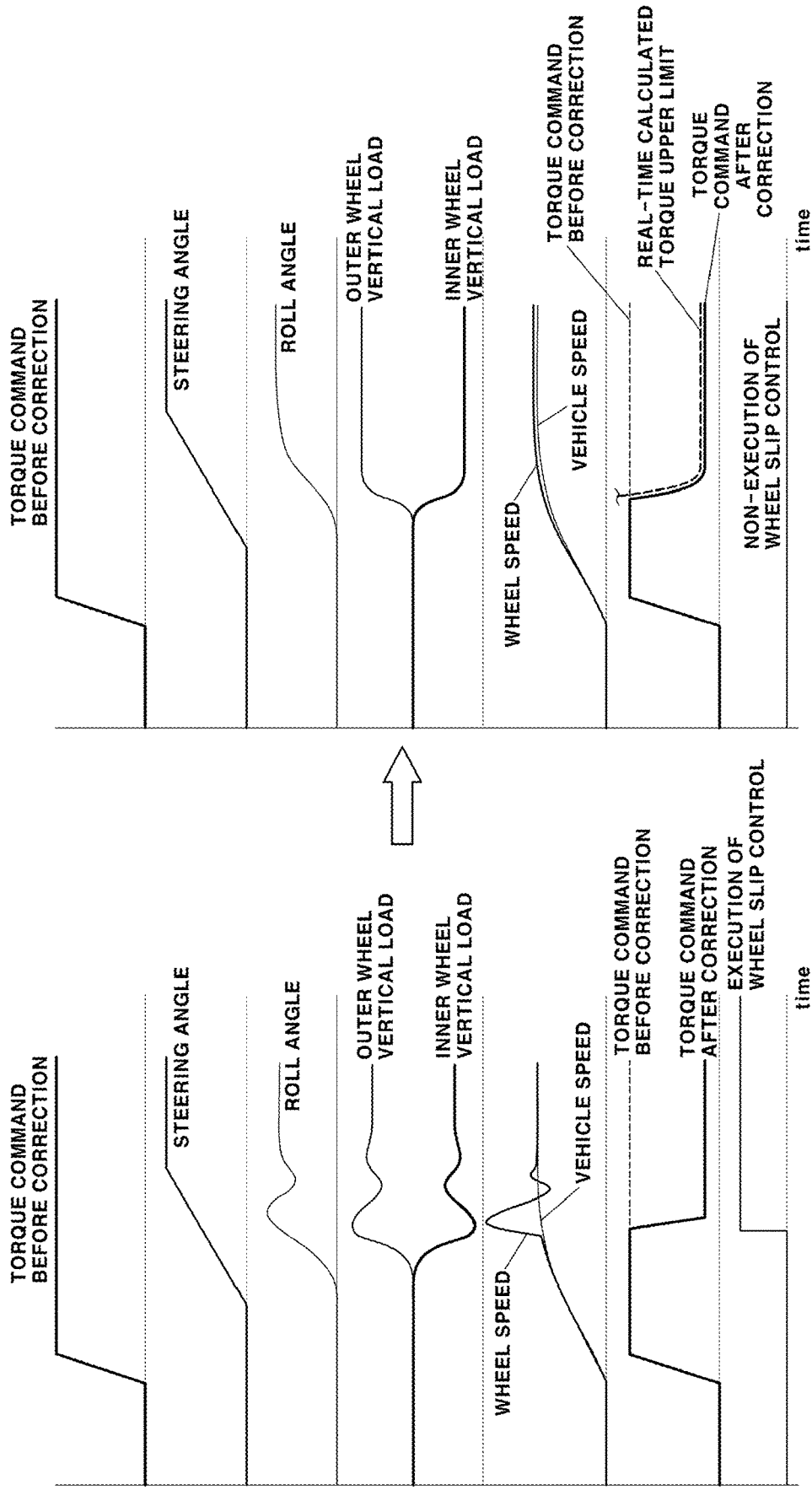
FIG. 4 is a view comparatively illustrating a conventional wheel slip control state and a wheel slip control state according to an exemplary embodiment of the present disclosure.

FIG. 4 is a view comparatively illustrating a conventional wheel slip control state and a wheel slip control state according to an exemplary embodiment of the present disclosure. FIG. 4 shows that, to control driving force according to an exemplary embodiment of the present disclosure, the torque upper limit is determined in real time from vertical load information and the final torque command obtained by correcting the basic torque command, i.e., the torque command after correction, is determined so as not to exceed the determined torque upper limit. Furthermore, referring to FIG. 4, in an exemplary embodiment of the present disclosure, operation of the driving device 40 is controlled in accordance with the torque command after correction, and thereby, occurrence of wheel slip may be suppressed, and thus wheel slip control may not be executed.

Although the above description shows that a control subject includes the first controller 20 and the second controller 30, the control process according to an exemplary embodiment of the present disclosure may be performed even by one integrated control element instead of a plurality of controllers. The plurality of controllers and the integrated control element may be commonly referred to as controllers, and the control process according to an exemplary embodiment of the present disclosure may be performed by these controllers. That is, the first controller and the second controller may be commonly referred to as the controllers.

In general, operation of a driving device (an engine or a motor) of a vehicle, including regenerative braking through the motor, may be controlled in accordance with a torque command while driving of the vehicle, and a torque output from the driving device (in the case of driving torque rather than regenerative braking torque) may accelerate the vehicle. Furthermore, when a driver operates a steering wheel while the vehicle travels at an arbitrary speed by the torque of the driving device, the vehicle turns.

Here, turning of the vehicle is performed based on a steering angle, i.e., a steering input value by a driver, a roll angle is generated by lateral dynamics during turning of the vehicle, and vertical loads of a left wheel and a right wheel are simultaneously changed. This may be understood as lateral load transfer, and in general, a vertical load (normal force) applied to the inner wheel during turning of the vehicle is decreased compared to a vertical load applied thereto during straight driving of the vehicle, and a vertical load applied to the outer wheel during turning of the vehicle is increased compared to a vertical load applied thereto during straight driving of the vehicle.

The vertical loads of the left wheel and the right wheel during turning of the vehicle are not simply decreased or increased, and change patterns of the vertical loads may be varied depending on dynamic characteristics of suspension devices of the vehicle, a roll stabilizer and a vehicle body. Furthermore, depending on these excessive vertical load changes, slip of the driving wheels instantaneously occurs, the wheel speeds of the driving wheels are converged, and then, slip of the driving wheels occurs again.

Wheel slip control may not be smoothly carried out due to such a phenomenon, a considerable amount of wheel slip may occur, and wheel slip may cause serious lateral grip force loss and instability based on general tire characteristics in which lateral grip force is inversely proportional to a longitudinal slip amount. These characteristics may be understood as limitations of the feedback control method which copes with wheel slip after occurrence of the wheel slip.

On the other hand, in an exemplary embodiment of the present disclosure, tire vertical load information of the left wheel and the right wheel may be obtained from a transfer function, a model, learning, or machine learning, and driving force may be corrected and controlled in real time based on the tire vertical load information, being configured for preventing occurrence of wheel slip in advance. Therefore, the conventional wheel slip control intervention is unnecessary. Furthermore, vertical loads interlocked with roll motion and a torque upper limit in proportion thereto may be obtained in real time, and thus, the state in which the torque of the driving device 40 is lower than the torque upper limit may always be maintained (with reference to FIG. 4).

Hereinafter, the method for controlling driving force of the vehicle by the controller will be described in more detail.

In an exemplary embodiment of the present disclosure, the controller is configured to determine a torque upper limit based on vertical load information detected in real time (Operation S13 in FIG. 2), and controls the torque of the driving device so as not to exceed the determined torque upper limit. Here, when a basic torque command determined in real time from vehicle driving information exceeds the torque upper limit determined in real time, the basic torque command is corrected so as not to exceed the torque upper limit, and the corrected torque command is used as a final torque command. On the other hand, when the basic torque command does not exceed the torque upper limit, the basic torque command is used as the final torque command without correction.

Here, the controller may be configured to determine the torque upper limit from vertical load (normal force) information determined by the transfer function. The torque upper limit is set to basically prevent slip of the inner wheel, and thus, the torque upper limit is set using a smaller one of a left wheel vertical load and a right wheel vertical load.

In general, when the vehicle is turning in the normal state thereof, the vertical load of the inner wheel close to the center of turning is smaller than the vertical load of the outer wheel, and thus, the torque upper limit may be determined based on the vertical load of the inner wheel.

In an exemplary embodiment of the present disclosure, the torque upper limit should be set based on the vertical load of the inner wheel based on the center of turning when lateral load transfer of the vehicle occurs and thus there is a deviation of the vertical loads between the left wheel and the right wheel. That is, in a situation in which the vertical load of the inner wheel is decreased and the vertical load of the outer wheel is increased due to lateral load transfer, the torque upper limit is set to be interlocked with the decreased vertical load of the inner wheel.

Equation 1 below is one example of an equation to determine a torque upper limit using vertical load information.

$$\text{Torque Upper Limit} = \sigma_0 \times \sigma_1 \times \min(\text{Left Wheel Vertical Load, Right Wheel Vertical Load}) \quad \text{[Equation 1]}$$

As set forth in Equation 1, the torque upper limit is determined using a smaller one of the left wheel vertical load and the right wheel vertical load. The torque upper limit may be a value to limit the final total driving force applied to the vehicle, and the left wheel vertical load and the right wheel vertical load may be the vertical load of a left front wheel and the vertical load of a right front wheel, or the sum of the vertical loads of all left wheels and the sum of the vertical loads of all right wheels. For example, the left wheel vertical load may be the sum of the vertical load of a left front wheel and the vertical load of a left rear wheel.

In Equation 1, $\sigma_0$ is a coefficient predetermined to convert the vertical load information into the torque upper limit, i.e., to achieve unit coincidence and conversion between vertical load (unit: N) and torque (unit: N·m). Furthermore, $\sigma_1$ is a parameter value interlocked with maximum friction coefficient information of a road on which the vehicle is driving. When there is no friction coefficient information of the road in the vehicle, $\sigma_1$ may not be used in determination of the torque upper limit.

However, when there is friction coefficient information of the road, the controller is configured to adjust the torque upper limit depending on the maximum coefficient of friction of the road using $\sigma_1$, as set forth in Equation 1. That is, the controller may be configured to determine the maximum friction coefficient securing rate (%) of the road on which the vehicle is driving, i.e., the rate (%) of the maximum coefficient of friction of the road on which the vehicle to the maximum coefficient of friction of a high-friction road, and may determine the torque upper limit through Equation 1 above using the determined maximum friction coefficient securing rate (%) as $\sigma_1$.

Hereinafter, the maximum friction coefficient securing rate (%) will be described. In general, the high-friction road is a dry asphalt road, and the maximum coefficient of friction of the dry asphalt road as the high-friction road may be about 0.9–1. Therefore, the maximum coefficient of friction of the high-friction road may be set to 1 which is the maximum coefficient of friction of the dry asphalt road.

Furthermore, a slippery road, such as a sand road, a wet road or a snowy road, is a low-friction road, and the maximum coefficient of friction of such a low-friction road is less than that of the high-friction road. For example, when the maximum coefficient of friction of the road on which the vehicle is driving is 0.3, the maximum friction coefficient securing rate (%) of the road on which the vehicle is driving to the high-friction road having the maximum coefficient of friction of 1 is 30%. Accordingly, the maximum friction coefficient securing rate (%) of the road on which the vehicle is driving to the high-friction road may be defined as the percentage value of the maximum coefficient of friction to the road on which the vehicle is driving to the predetermined maximum coefficient of friction of the high-friction road.

Furthermore, the torque upper limit is determined by multiplying the maximum friction coefficient securing rate (%) of the road on which the vehicle is driving by the above-described factors. When the maximum friction coefficient securing rate of the road on which the vehicle is driving is 30% (i.e., $\sigma_1$=0.3), the torque upper limit is determined by multiplying 0.3 (=30%) by the above-described other factors.

Figure 5:
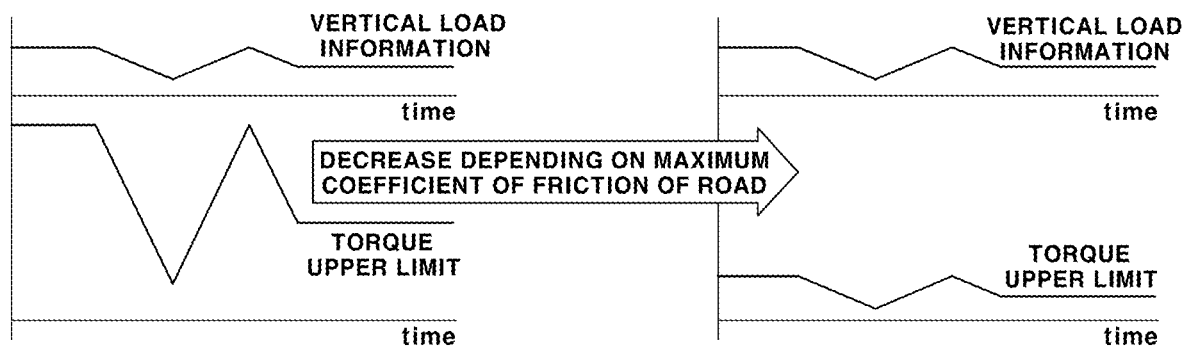
FIG. 5 is a view exemplarily illustrating adjustment of a torque upper limit value depending on the maximum coefficient of friction of a road according to an exemplary embodiment of the present disclosure.

A method for determining the coefficient of friction of the road on which the vehicle is driving based on image information captured by cameras in a vehicle has been known. The parameter value $\sigma_1$ interlocked with the maximum friction coefficient information of the road on which the vehicle is driving is used in Equation 1, as described above and thus, the torque upper limit which is actually used may be adjusted depending on the maximum coefficient of friction of the road on which the vehicle is driving even in the same vertical load state, as shown in FIG. 5.

In Equation 1, the torque upper limit is determined by reflecting only the vertical load information of the inner wheel is reflected. However, a torque upper limit may be determined by reflecting both a roll angle $\varphi$ which is real-time roll motion information of the vehicle, and a roll angle change rate (roll rate) $\rho$ obtained from the roll angle $\varphi$. Here, the roll angle change rate information may also be obtained from the transfer function in the same manner as the roll angle and the vertical load information, or may be obtained by differentiating the roll angle. Equation 2 below is an equation to determine the torque upper limit simultaneously using the roll angle $\varphi$, the roll angle change rate $\rho$, and the vertical load information.

$$\text{Torque Upper Limit} = \sigma_0 \times \sigma_1 \times \min(\text{Left Wheel Vertical Load, Right Wheel Vertical Load}) - \sigma_2 \times |\varphi| - \sigma_3 \times \text{sign}(\varphi) \times \rho \quad \text{[Equation 2]}$$

Figure 6:
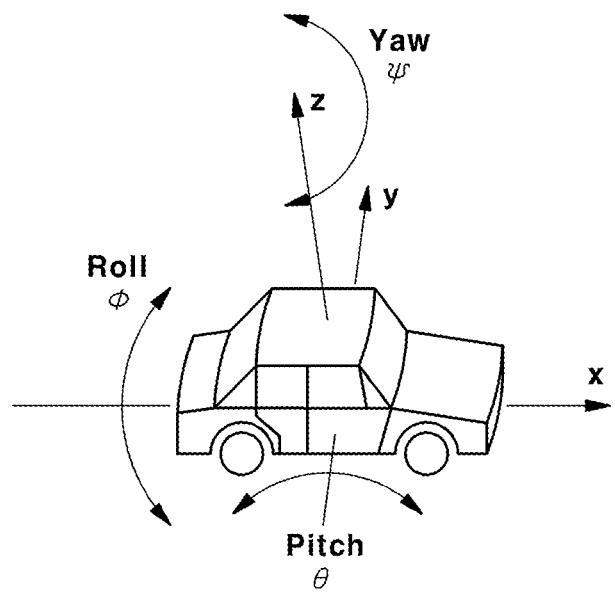
FIG. 6 is a view exemplarily illustrating a vehicle coordinate frame and the roll angle of a vehicle therein.

In Equation 2, $\varphi$ indicates the roll angle, and $\rho$ is the roll angle change rate. Here, the roll angle $\varphi$ is defined as shown in FIG. 6. Furthermore, $\sigma_0$ and $\sigma_1$ have the same definitions as in Equation 1, $\sigma_2$ and $\sigma_3$ are coefficients to determine how much the roll angle $\varphi$ and the roll angle change rate $\sigma$ are reflected in the torque upper limit value, and these values are predetermined by the controller. Furthermore, sign($\varphi$) is set to +1 when the roll angle $\varphi$ has a positive value, and is set to −1 when the roll angle $\varphi$ has a negative value. Furthermore, the mark | | indicates absolute value.

The reason why the torque upper limit is determined using the absolute value of the roll angle in Equation 2 is to reflect an effect in which, as the angle of a vehicle tilted to any one side, i.e., the left or the right, from the center thereof increases in connection with the roll angle, a vertical load applied to one side of the vehicle decreases.

Furthermore, the reason why the product of the roll angle change rate and the sign($\varphi$) indicating the direction of the roll angle is reflected in determination of the torque upper limit is to decrease the torque upper limit when there is the component of the roll angle change rate in a direction of tilting away from the center of the vehicle and to increase the torque upper limit when there is the component of the roll angle change rate in a direction of returning to the center of the vehicle.

Furthermore, in another exemplary embodiment of the present disclosure, the torque upper limit may be determined as set forth in Equation 3 below.

$$\text{Torque Upper Limit} = \min\{(\sigma_0 \times \sigma_1 \times \text{Left Wheel Vertical Load} - \sigma_2 \times \varphi - \sigma_3 \times \rho), (\sigma_0 \times \sigma_1 \times \text{Right Wheel Vertical Load} + \sigma_2 \times \varphi + \sigma_3 \times \rho)\} \quad \text{[Equation 3]}$$

The behavior direction of the vehicle follows an ISO vehicle coordinate frame shown in FIG. 6. Furthermore, the respective marks in Equation 3 have the same definitions as in Equation 2.

In the determinations of Equation 2 and Equation 3, one of the roll angle and the roll angle change rate may not be used. That is, in Equation 2 and Equation 3, the terms "$\sigma_2 \times |\varphi|$" and "$\sigma_2 \times \varphi$" may be deleted. Otherwise, the terms "$\sigma_3 \times sign(\varphi) \times \rho$" and "$\sigma_3 \times \rho$" may be deleted.

After the torque upper limit is determined, as described above, the controller is configured to compare the basic torque command determined from the vehicle driving information (i.e., the torque command before correction) with the torque upper limit (Operation S14 in FIG. 2), and corrects the basic torque command, when the basic torque command exceeds the torque upper limit, so that the final torque command (i.e., the torque command after correction) does not exceed the torque upper limit (Operation S15 in FIG. 2). Thereafter, the controller is configured to execute torque correction control in which operation of the driving device 40 is controlled to generate driving force in accordance with the torque command after correction (Operation S16 in FIG. 2).

In an exemplary embodiment of the present disclosure, the vertical load information and the roll motion information are not limited to be used to determine the torque upper limit, and may be used to correct actual driving force. Equation 4 below is an equation to correct the basic torque command (i.e., the torque command before correction), i.e., an equation to determine the final torque command (i.e., the torque command after correction) obtained by correcting the basic torque command.

$$\text{Torque Command after Correction} = \text{Torque Command before Correction} - \sigma_4 \times \{\text{Basic Average Vertical Load} - \min(\text{Left Wheel Vertical Load}, \text{Right Wheel Vertical Load})\} - \sigma_5 \times |\varphi| - \sigma_6 \times sign(\varphi) \times \rho$$

[Equation 4]

The torque command before correction in Equation 4 is the basic torque command, and the torque command after correction in Equation 4 is the final torque command. Furthermore, although Equation 4 shows three components using $\sigma_4$, $\sigma_5$ and $\sigma_6$, an equation having at least one of the three components may be used as the equation to determine the torque command after correction. That is, the torque command after correction may be determined using an equation having at least one of the three terms at the right side of Equation 4, and Equation 4 is used as an equation to determine the torque command after correction in the case in which all three terms are used.

In Equation 4, the basic average vertical load is the average vertical load of the left wheels and the right wheels in the stopped state of the vehicle based on a flat road, and $\sigma_4$ indicates a predetermined coefficient to convert the load information into a torque value, i.e., to achieve unit coincidence and conversion. $\sigma_5$ and $\sigma_6$ indicate coefficients to determine how much the roll angle $\varphi$ and the roll angle change rate $\rho$ are reflected in a one-sided braking amount, and these values are predetermined by the controller.

Accordingly, the method for controlling driving force of the vehicle according to an exemplary embodiment of the present disclosure has been described in detail. In the above-described method for controlling driving force of the vehicle according to an exemplary embodiment of the present disclosure, driving force reduction control may be executed in consideration of real-time lateral vertical load change before occurrence of wheel slip, excessive roll motion may be prevented therethrough, and lateral grip force of tires may be stably secured. Furthermore, a roll damping effect may be obtained in consideration of the real-time vertical load change and roll motion dynamics. That is, rollover (rolling of the vehicle) may be prevented. Such effects according to an exemplary embodiment of the present disclosure are more effectively exhibited in sport utility vehicle (SUVs) in which the distance between the center of gravity and a roll center is long.

As is apparent from the above description, in a method for controlling driving force of a vehicle according to an exemplary embodiment of the present disclosure, driving force reduction control may be executed in consideration of real-time lateral vertical load change before occurrence of wheel slip, excessive roll motion may be prevented therethrough, and lateral grip force of tires may be stably secured. Furthermore, a roll damping effect may be obtained in consideration of the real-time vertical load change and roll motion dynamics. That is, rollover (rolling of the vehicle) may be prevented. Such effects according to an exemplary embodiment of the present disclosure are more effectively exhibited in sport utility vehicle (SUVs) in which the distance between the center of gravity and a roll center is long.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code that may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium having such software or commands stored thereon and executable on the apparatus or the computer.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling a driving force of a vehicle, the method comprising:
   determining, by a controller, a basic torque command in real time based on vehicle driving information obtained while driving of the vehicle;
   obtaining, by the controller, real-time vertical load information of a left wheel and a right wheel of the vehicle based on information collected from the vehicle;
   determining, by the controller, a torque upper limit from the real-time vertical load information;
   determining, by the controller, a final torque command limited so as not to exceed the torque upper limit thus determined based on the basic torque command; and
   controlling, by the controller, operation of the driving device configured to drive the vehicle, according to the final torque command.

2. The method of claim 1, wherein, in the determining the torque upper limit, the torque upper limit is determined from a smaller vertical load out of a left wheel vertical load and a right wheel vertical load.

3. The method of claim 1, wherein, in the determining the torque upper limit, the torque upper limit is determined by Equation E1:

$$\text{Torque Upper Limit} = \sigma_0 \times \sigma_1 \times \min(\text{Left Wheel Vertical Load, Right Wheel Vertical Load}), \quad \text{E1})$$

wherein $\sigma_0$ is a coefficient predetermined by the controller to convert load information into a torque value, and $\sigma_1$ is a parameter value determined by the controller to correspond to a maximum coefficient of friction of a road on which the vehicle is driving.

4. The method of claim 1, wherein, in the determining the torque upper limit, the torque upper limit is determined by Equation E2:

$$\text{Torque Upper Limit} = \sigma_0 \times \min(\text{Left Wheel Vertical Load, Right Wheel Vertical Load}), \quad \text{E2})$$

wherein $\sigma_0$ is a coefficient predetermined by the controller to convert load information into a torque value.

5. The method of claim 1, wherein, in the determining the torque upper limit, the torque upper limit is determined using real-time roll motion information of the vehicle, obtained from the information collected by the vehicle, in addition to the real-time vertical load information.

6. The method of claim 5, wherein the roll motion information includes at least one of a roll angle or a roll angle change rate.

7. The method of claim 1, wherein, in the determining the torque upper limit, the torque upper limit is determined by either one of Equations E3 and Equation E3':

$$\text{Torque Upper Limit} = \sigma_0 \times \sigma_1 \times \min(\text{Left Wheel Vertical Load, Right Wheel Vertical Load}) - \sigma_2 \times |\phi| - \sigma_3 \times \text{sign}(\phi) \times \rho; \text{ and} \quad \text{E3})$$

$$\text{Torque Upper Limit} = \min\{(\sigma_0 \times \sigma_1 \times \text{Left Wheel Vertical Load} - \sigma_2 \times \phi - \sigma_3 \times \rho), (\sigma_0 \times \sigma_1 \times \text{Right Wheel Vertical Load} + \sigma_2 \times \phi + \sigma_3 \times \rho)\}, \quad \text{E3'})$$

wherein $\sigma_0$ is a coefficient predetermined by the controller to convert load information into a torque value, $\sigma_1$ is a parameter value determined by the controller to correspond to a maximum coefficient of friction of a road on which the vehicle is driving, $\sigma_2$ and $\sigma_3$ are coefficients having values predetermined by the controller, and $\phi$ and $\rho$ are a roll angle and a roll angle change rate out of real-time roll motion information of the vehicle obtained from the information collected by the vehicle.

8. The method of claim 1, wherein, in the determining the torque upper limit, the torque upper limit is determined by either one of Equation E4 and Equation E4':

$$\text{Torque Upper Limit} = \sigma_0 \times \sigma_1 \times \min(\text{Left Wheel Vertical Load, Right Wheel Vertical Load}) - \sigma_2 \times |\phi|; \text{ and} \quad \text{E4})$$

$$\text{Torque Upper Limit} = \min\{(\sigma_0 \times \sigma_1 \times \text{Left Wheel Vertical Load} - \sigma_2 \times \phi), (\sigma_0 \times \sigma_1 \times \text{Right Wheel Vertical Load} + \sigma_2 \times \phi)\}, \quad \text{E4'})$$

wherein $\sigma_0$ is a coefficient predetermined by the controller to convert load information into a torque value, $\sigma_1$ is a parameter value determined by the controller to correspond to a maximum coefficient of friction of a road on which the vehicle is driving, $\sigma_2$ is a coefficient having a value predetermined by the controller, and $\phi$ is a roll angle out of real-time roll motion information of the vehicle obtained from the information collected by the vehicle.

9. The method of claim 1, wherein, in the determining the torque upper limit, the torque upper limit is determined by either one of Equation E5 and Equation E5':

Torque Upper Limit=$\sigma_0 \times \sigma_1 \times$min(Left Wheel Vertical Load, Right Wheel Vertical Load)$-\sigma_3 \times$sign$(\phi) \times \rho$; and  (E5)

Torque Upper Limit=min{$(\sigma_0 \times \sigma_1 \times$Left Wheel Vertical Load$-\sigma_3 \times \rho)$, $(\sigma_0 \times \sigma_1 \times$Right Wheel vertical load$+\sigma_3 \times \rho)$},  (E5')

wherein $\sigma_0$ is a coefficient predetermined by the controller to convert load information into a torque value, $\sigma_1$ is a parameter value determined by the controller to correspond to a maximum coefficient of friction of a road on which the vehicle is driving, $\sigma_3$ is a coefficient having a value predetermined by the controller, and $\phi$ and $\rho$ are a roll angle and a roll angle change rate out of real-time roll motion information of the vehicle obtained from the information collected by the vehicle.

10. The method of claim 1, wherein, in the determining the final torque command, the controller is configured to compare the basic torque command with the torque upper limit, and to determine the torque upper limit as the final torque command when the basic torque command exceeds the torque upper limit.

11. The method of claim 1, wherein, in the determining the final torque command, the controller is configured to compare the basic torque command with the torque upper limit, and to determine the basic torque command as the final torque command when the basic torque command is equal to or less than the torque upper limit.

12. The method of claim 1, wherein, in the determining the final torque command, the controller is configured to correct the basic torque command using the real-time vertical load information, and to determine a torque command after correction as the final torque command, so that the final torque command does not exceed the torque upper limit.

13. The method of claim 12, wherein the torque command after correction is determined by Equation E6:

Torque Command after Correction=Basic Torque Command$-\sigma_4 \times$ {Basic Average Vertical Load$-$min(Left Wheel Vertical Load, Right Wheel Vertical Load)}$-\sigma_5 \times |\phi| - \sigma_6 \times$sign$(\phi) \times \rho$,  (E6)

wherein the basic average vertical load is an average vertical load of left wheels and right wheels in a stopped state of the vehicle based on a flat road, $\sigma_4$ is a coefficient predetermined by the controller to convert load information into a torque value, $\sigma_5$ and $\sigma_6$ are coefficients including values predetermined by the controller, and $\phi$ and $\rho$ are a roll angle and a roll angle change rate out of real-time roll motion information of the vehicle obtained from the information collected by the vehicle.

14. The method of claim 12, wherein the torque command after correction is determined by Equation E7:

Torque Command after Correction=Basic Torque Command$-\sigma_4 \times$ {Basic Average Vertical Load$-$min(Left Wheel Vertical Load, Right Wheel Vertical Load)}$-\sigma_5 \times |\phi|$,  (E7)

wherein the basic average vertical load is an average vertical load of left wheels and right wheels in a stopped state of the vehicle based on a flat road, $\sigma_4$ is a coefficient predetermined by the controller to convert load information into a torque value, $\sigma_5$ is a coefficient having a value predetermined by the controller, and $\phi$ is a roll angle out of real-time roll motion information of the vehicle obtained from the information collected by the vehicle.

15. The method of claim 12, wherein the torque command after correction is determined by Equation E8:

Torque Command after Correction=Basic Torque Command$-\sigma_4 \times$ {Basic Average Vertical Load$-$min(Left Wheel Vertical Load, Right Wheel Vertical Load)}$-\sigma_6 \times$sign$(\phi) \times \rho$,  (E8)

wherein the basic average vertical load is an average vertical load of left wheels and right wheels in a stopped state of the vehicle based on a flat road, $\sigma_4$ is a coefficient predetermined by the controller to convert load information into a torque value, $\sigma_6$ is a coefficient having a value predetermined by the controller, and $\phi$ and $\rho$ are a roll angle and a roll angle change rate out of real-time roll motion information of the vehicle obtained from the information collected by the vehicle.

16. The method of claim 12, wherein the torque command after correction is determined by Equation E9:

Torque Command after Correction=Basic Torque Command$-\sigma_4 \times$ {Basic Average Vertical Load$-$min(Left Wheel Vertical Load, Right Wheel Vertical Load)},  (E9)

wherein the basic average vertical load is an average vertical load of left wheels and right wheels in a stopped state of the vehicle based on a flat road, and $\sigma_4$ is a coefficient predetermined by the controller to convert load information into a torque value.

17. An apparatus of controlling driving force of a vehicle, the apparatus comprising:
   a driving device configured to drive the vehicle including a left wheel and a right wheel; and
   a controller electrically connected to the driving device, wherein the controller is configured for:
      determining a basic torque command in real time based on vehicle driving information obtained while driving of the vehicle;
      obtaining real-time vertical load information of the left wheel and the right wheel of the vehicle based on information collected from the vehicle;
      determining a torque upper limit from the real-time vertical load information;
      determining a final torque command limited so as not to exceed the torque upper limit thus determined based on the basic torque command; and
      controlling operation of the driving device, according to the final torque command.

18. The apparatus of claim 17, wherein, in the determining the torque upper limit, the torque upper limit is determined from a smaller vertical load out of left wheel vertical load and right wheel vertical load, or the torque upper limit is determined using real-time roll motion information of the vehicle, obtained from the information collected by the vehicle, in addition to the real-time vertical load information.

19. The apparatus of claim 17, wherein, in the determining the final torque command, the controller is configured to compare the basic torque command with the torque upper limit and to determine the torque upper limit as the final torque command when the basic torque command exceeds the torque upper limit, or the controller is configured to compare the basic torque command with the torque upper limit and to determine the basic torque command as the final torque command when the basic torque command is equal to or less than the torque upper limit.

20. The apparatus of claim 17, wherein, in the determining the final torque command, the controller is configured to correct the basic torque command using the real-time vertical load information, and to determine a torque command after correction as the final torque command, so that the final torque command does not exceed the torque upper limit.

* * * * *